United States Patent
Hallberg (10) Patent No.: US 8,325,236 B2
(45) Date of Patent: Dec. 4, 2012

(54) METHODS AND SYSTEMS FOR CABLE-CONNECTION DETECTION

(75) Inventor: Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1165 days.

(21) Appl. No.: 11/781,099

(22) Filed: Jul. 20, 2007

(65) Prior Publication Data

US 2007/0264862 A1   Nov. 15, 2007

Related U.S. Application Data (63) Continuation-in-part of application No. 11/367,939, filed on Mar. 3, 2006, and a continuation-in-part of application No. 11/367,937, filed on Mar. 3, 2006.

(51) Int. Cl.

| | |
|---|---|
| H04N 17/00 | (2006.01) |
| H04N 17/02 | (2006.01) |
| H04N 11/00 | (2006.01) |
| H04N 3/27  | (2006.01) |
| H04N 5/50  | (2006.01) |
| H04N 5/46  | (2006.01) |
| H04N 5/268 | (2006.01) |

(52) U.S. Cl. ........ 348/180; 348/552; 348/554; 348/569; 348/558; 348/706

(58) Field of Classification Search .................. 348/180, 348/552, 554, 558, 706
See application file for complete search history.

(56) References Cited

U.S. PATENT DOCUMENTS

| | | | |
|---|---|---|---|
| 4,942,472 A | 7/1990 | Imbert | |
| 5,274,448 A | 12/1993 | Lenz et al. | |
| 5,903,266 A * | 5/1999 | Berstis et al. | 715/708 |
| 6,064,422 A * | 5/2000 | Goolcharan et al. | 348/14.12 |
| 6,202,210 B1 | 3/2001 | Ludtke | |
| 6,371,854 B1 * | 4/2002 | Ikeda et al. | 463/42 |
| 6,448,963 B1 * | 9/2002 | Han | 345/213 |
| 6,469,742 B1 * | 10/2002 | Trovato et al. | 348/553 |
| 6,530,085 B1 * | 3/2003 | Perlman | 725/82 |
| 6,756,997 B1 | 6/2004 | Ward | |
| 6,772,096 B2 * | 8/2004 | Murakami et al. | 702/184 |
| 6,781,635 B1 * | 8/2004 | Takeda | 348/552 |
| 6,819,364 B2 | 11/2004 | Creed | |
| 6,829,779 B1 * | 12/2004 | Perlman | 725/37 |
| 7,043,691 B1 * | 5/2006 | Kwon et al. | 715/705 |
| 7,107,529 B2 * | 9/2006 | Lee | 715/705 |
| 7,283,178 B2 * | 10/2007 | Dahlseid et al. | 348/553 |
| 7,295,194 B2 * | 11/2007 | Lee | 345/204 |

(Continued)

FOREIGN PATENT DOCUMENTS

| | | |
|---|---|---|
| EP | 1517259 | 3/2005 |

(Continued)

OTHER PUBLICATIONS

U.S. Office Action—U.S. Appl. No. 11/838,188—Mailing Date Apr. 28, 2011.

(Continued)

Primary Examiner — Brian Yenke (74) Attorney, Agent, or Firm — Kristine Elizabeth Matthews; David C. Ripma (57) ABSTRACT

Aspects of the present invention relate to systems and methods for detecting the connection status of a communicatively-connected device.

20 Claims, 6 Drawing Sheets

U.S. PATENT DOCUMENTS

| | | | |
|---|---|---|---|
| 7,333,131 B2* | 2/2008 | Manabe | 348/194 |
| 7,526,582 B2* | 4/2009 | Best et al. | 710/15 |
| 7,644,426 B2* | 1/2010 | Suh | 725/43 |
| 7,755,503 B2* | 7/2010 | Bonorden et al. | 340/686.1 |
| 7,797,711 B2* | 9/2010 | Iwamura | 725/37 |
| 7,880,816 B2* | 2/2011 | Kinoshita et al. | 348/705 |
| 7,889,233 B2* | 2/2011 | Mead et al. | 348/180 |
| 7,921,235 B2* | 4/2011 | Best et al. | 710/15 |
| 8,009,234 B2* | 8/2011 | Lee et al. | 348/706 |
| 2001/0052946 A1* | 12/2001 | Sato | 348/706 |
| 2002/0060676 A1* | 5/2002 | Kim | 345/212 |
| 2002/0065912 A1 | 5/2002 | Catchpole et al. | |
| 2003/0110412 A1* | 6/2003 | Neville | 714/25 |
| 2004/0119731 A1* | 6/2004 | Lee | 345/699 |
| 2004/0143669 A1 | 7/2004 | Zhao et al. | |
| 2004/0189805 A1* | 9/2004 | Seitz | 348/188 |
| 2005/0018084 A1* | 1/2005 | Cho | 348/569 |
| 2005/0140787 A1* | 6/2005 | Kaplinsky | 348/207.1 |
| 2005/0141542 A1 | 6/2005 | Handekyn | |
| 2005/0149980 A1 | 7/2005 | Yun | |
| 2005/0162562 A1* | 7/2005 | Nave | 348/678 |
| 2005/0190306 A1* | 9/2005 | Lee | 348/734 |
| 2005/0259181 A1* | 11/2005 | Watanabe | 348/554 |
| 2006/0001776 A1* | 1/2006 | Araki | 348/705 |
| 2006/0078072 A1 | 4/2006 | Cheon | |
| 2006/0158838 A1* | 7/2006 | Kinoshita et al. | 361/681 |
| 2006/0164561 A1* | 7/2006 | Lacy et al. | 348/706 |
| 2006/0197841 A1* | 9/2006 | Young et al. | 348/177 |
| 2006/0221254 A1* | 10/2006 | Chang | 348/706 |
| 2006/0230312 A1* | 10/2006 | Nichols et al. | 714/25 |
| 2007/0126930 A1* | 6/2007 | Jang | 348/558 |
| 2007/0143576 A1* | 6/2007 | Ellgen et al. | 712/10 |
| 2007/0153131 A1* | 7/2007 | Yang et al. | 348/705 |
| 2007/0153132 A1* | 7/2007 | Jong | 348/705 |
| 2007/0162929 A1 | 7/2007 | Mickle et al. | |
| 2007/0298656 A1* | 12/2007 | He | 439/607 |
| 2008/0030620 A1* | 2/2008 | Tsai et al. | 348/572 |
| 2008/0055464 A1* | 3/2008 | Shin | 348/441 |
| 2008/0062328 A1* | 3/2008 | Bilbrey | 348/705 |
| 2008/0068501 A1* | 3/2008 | Hall | 348/496 |
| 2009/0304069 A1* | 12/2009 | Hoffert et al. | 375/240.01 |

FOREIGN PATENT DOCUMENTS

| | | |
|---|---|---|
| WO | WO0133858 | 5/2001 |
| WO | WO03044684 | 5/2003 |

OTHER PUBLICATIONS

USPTO Office Action—U.S. Appl. No. 11/838,188—Mailing Date Dec. 27, 2011.

* cited by examiner

METHODS AND SYSTEMS FOR CABLE-CONNECTION DETECTION

RELATED REFERENCES

This application is a continuation-in-part of U.S. patent application Ser. No. 11/367,939, entitled "Method and System for Configuring Media-Playing Sets," filed on Mar. 3, 2006; this application is also a continuation-in-part of U.S. patent application Ser. No. 11/367,937, entitled "Method and System for Configuring Media-Playing Sets," filed on Mar. 3, 2006. All applications listed in this section are hereby incorporated herein by reference.

FIELD OF THE INVENTION

Embodiments of the present invention comprise methods and systems for detecting the cable-connection status of a communicatively-connected device.

BACKGROUND

Audio/video (AV) equipment, and other communicatively-connected equipment, may have a large number of connection terminals with similar connectors. This may make the proper connection, also considered cabling, of such equipment difficult. An exemplary scenario may comprise the connection of home audio and video equipment to a television set (TV) in which many signals may be carried on cables with RCA connectors. AV source media may not be viewed as intended on the television set if the AV cables are improperly connected.

SUMMARY

Some embodiments of the present invention comprise methods and systems for determining the connection status of a communicatively-connected device wherein signal characteristics may be measured at a connection terminal and compared to expected signal characteristics.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Audio/video (AV) equipment, and other communicatively-connected equipment, may have a large number of connection terminals with similar connectors. This may make the proper connection, also considered cabling, of such equipment difficult. An exemplary scenario may comprise the connection of home audio and video equipment to a television set (TV) in which many signals may be carried on cables with RCA connectors. AV source media may not be viewed as intended on the television set if the AV cables are improperly connected.

Some embodiments of the present invention comprise methods and systems for detecting improperly connected cables in communicatively-connected equipment. In some embodiments of the present invention, cable-connection status may be reported to a user, also considered a customer. In some embodiments of the present invention, a recommendation for corrective action may be reported to the user. Some embodiments of the present invention may comprise methods and systems for reporting cable-connection status to a remote service center.

Some embodiments of the present invention comprise methods and systems for a communicatively-connected device to detect improperly connected cables and report the results to the user and/or to a remotely-located customer service agent. Some embodiments of the present invention may measure or detect the characteristics of a signal on a cable to determine the type of signal carried by the cable.

In an exemplary embodiment, the type of signal carried on a cable connected to a communicatively-connected device input may be determined by examining the characteristics of the signal carried on the cable. Signal amplitude and frequency comprise two characteristics by which signal types may be distinguished. Some signals may contain characteristic synchronization information, such as video horizontal- and vertical-synchronization signals, which may be used to distinguish signal types.

An audio signal for a communicatively-connected AV device, for example a TV, may be characterized by frequency content in the spectral range 20 Hz to 20 KHz, no synchronization information and no guaranteed repetition. A composite-video signal for a communicatively-connected AV device, for example a TV, may be characterized by frequency content in the spectral range 0 to 4.2 MHz, 3.58 MHz color sub-carrier content, a color burst pulse and repetitive horizontal- and vertical-synchronization pulses. A luminance or green component video signal for a communicatively-connected AV device, for example a TV, may be characterized by frequency content in the spectral range 0 to 4.2 MHz, no color sub-carrier content, no color burst pulse and repetitive horizontal- and vertical-synchronization pulses. A chrominance or blue or red component video signal may be characterized by frequency content in the spectral range 0 to 4.2 MHz, no color sub-carrier content, no color burst pulse and no synchronization pulses. While a radio frequency (RF) signal may be characterized by frequency content in the spectral range 50 MHz to 890 MHz.

Figure 1:
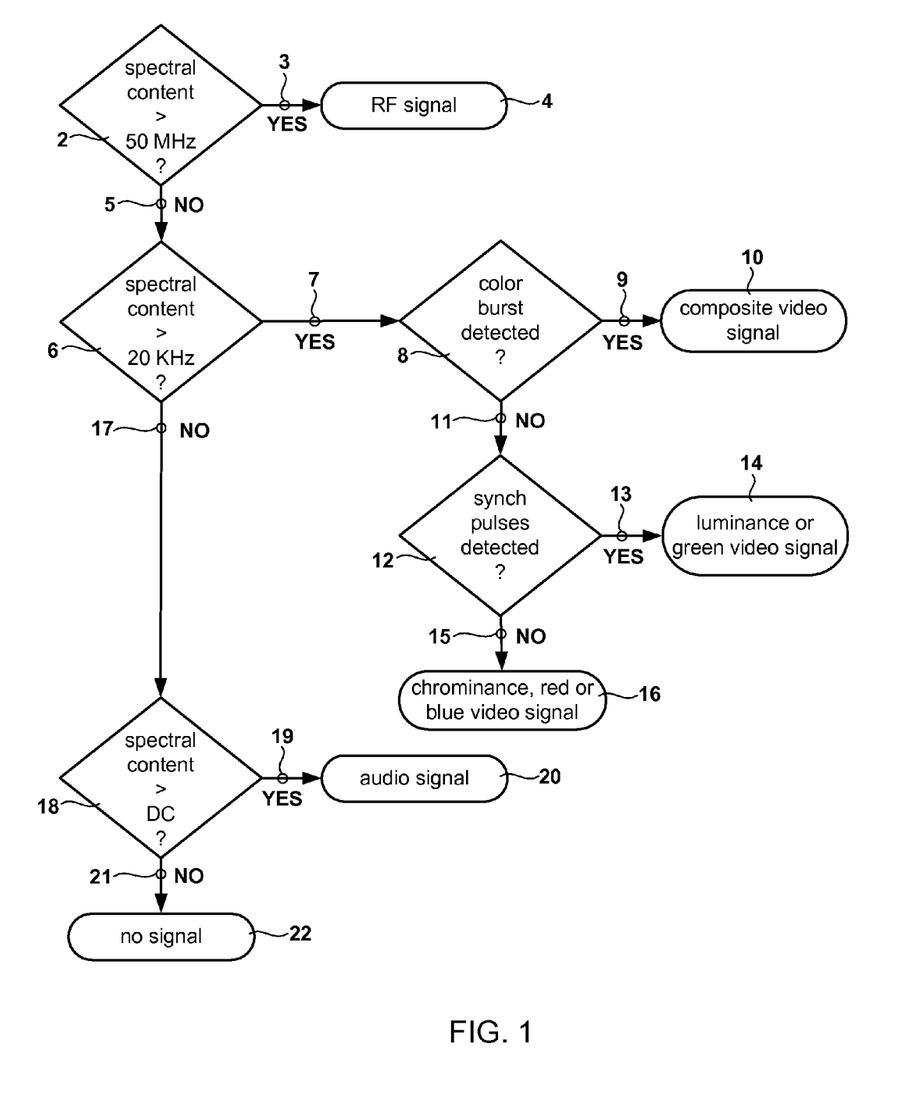
FIG. 1 is a flow diagram showing embodiments of the present invention in which a signal may be classified based on measured signal characteristics.

Some embodiments of the present invention, described in relation to FIG. 1, may comprise detection of signal characteristics and classification of the signal type based on the detected signal characteristics. In some embodiments of the present invention, the spectral content of an input signal may be examined to determine if there is spectral content above 50 MHz 2. If there is spectral content above 50 MHz 3, then the signal may be classified as an RF signal 4. If there is no spectral content above 50 MHz 5, then the input signal may be examined to determine if there is spectral content above 20 KHz 6. If there is spectral content above 20 KHz 7, then the input signal may be examined to determine if a color burst pulse may be detected 8. If a color burst pulse is detected 9, then the signal may be classified as a composite video signal 10. If a color burst pulse is not detected 11, the signal may be further examined for the presence of synchronization pulses 12. If synchronization pulses are detected 13, then the signal may be classified as a luminance or green video signal 14. If no synchronization pulses are detected 15, then the signal may be classified as a chrominance, red or blue video signal 16. If there is no spectral content above 20 KHz 17, then the input signal may be examined to determine if there is spectral content above DC 18. If there is spectral content above DC 19, then the signal may be classified as an audio signal 20. If there is not spectral content above DC 21, then the signal may be classified as "no signal" 22.

Some embodiments of the present invention may comprise resistor and capacitor (RC) based filters to pass only signals of a target frequency band. These RC filters may be used to determine the spectral content of the input signal. The output of an RC filter may connect to a level detector, for example, a comparator or an analog-to-digital converter (ADC).

Some embodiments of the present invention may comprise a synchronization detection circuit, of which many are known in the art. In some embodiments of the present invention, synchronization signals may be searched for at specific timing intervals. Some embodiments of the present invention may use a synchronization detection circuit which may be resident in a TV.

Figure 2:
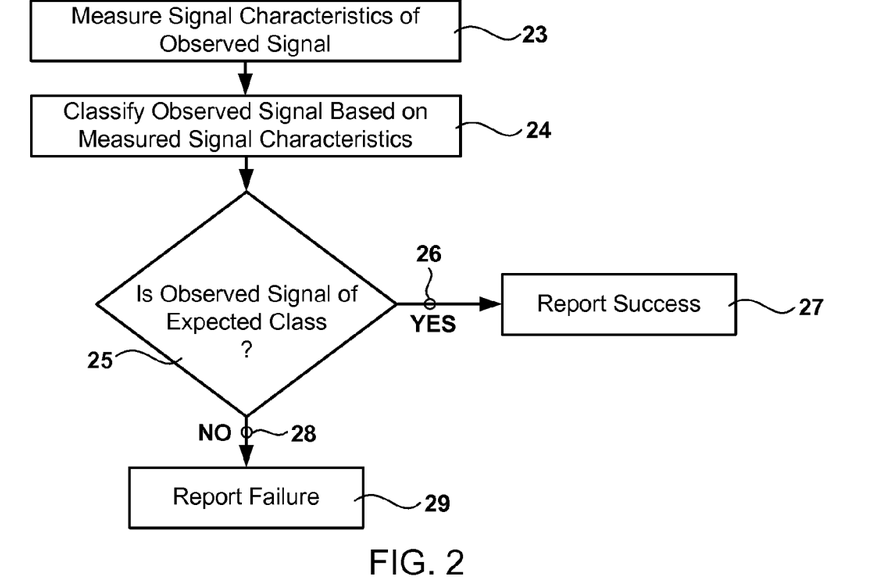
FIG. 2 is a flow diagram showing embodiments of the present invention in which signal characteristics may be measured to determine connection status of a communicatively-connected device.

Some embodiments of the present invention may be described in relation to FIG. 2. Characteristics of an observed signal may be measured 23. The observed signal may be classified based on the measured characteristics 24. The classification of the observed signal may be compared with an expected signal class 25. If the observed signal class is the same as the expected signal class 26, then success, or an indication of proper cabling configuration, may be reported 27. In some embodiments, success, or the indication of proper cabling configuration, may be reported 27 to a user. In alternative embodiments, success, or the indication of proper cabling configuration, may be reported 27 to a remote service center. If the observed signal class is not the same as the expected signal class 28, then failure, or an indication of improper cabling configuration, may be reported 29. In some embodiments, failure, or the indication of improper cabling configuration, may be reported 29 to a user. In alternative embodiments, failure, or the indication of improper cabling configuration, may be reported 29 to a remote service center.

In some embodiments of the present invention, status reporting to a user may be done with a visual or graphical representation on a display associated with the communicatively-connected device, for example on the display of a TV. In alternative embodiments of the present invention, an audible report may be generated. For example, a first sound may be generated when a cable is improperly connected to an input terminal. In some embodiments, the first sound may persist until the cable is disconnected.

Figure 3:
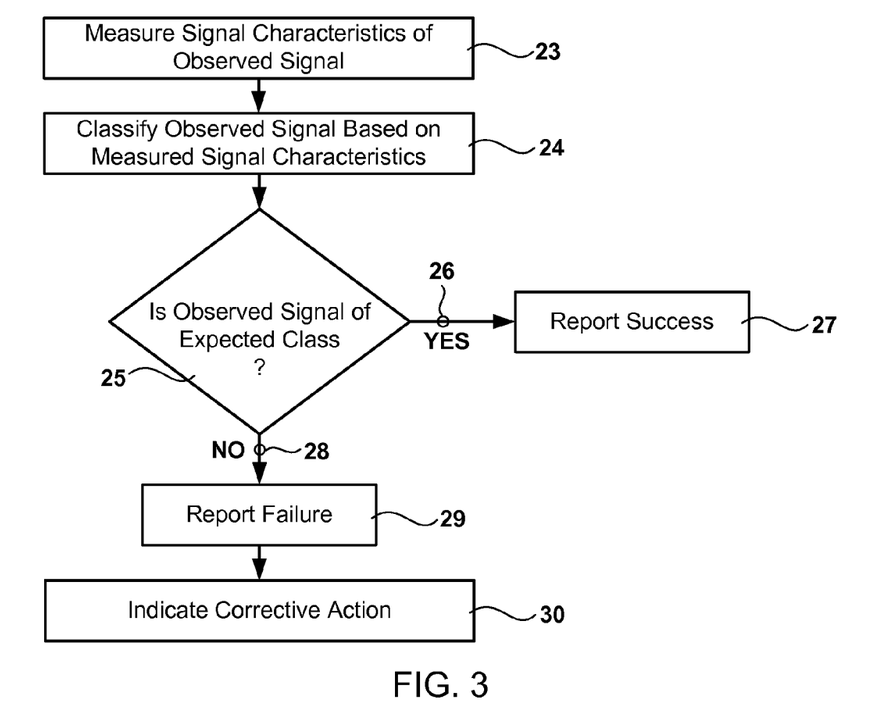
FIG. 3 is a flow diagram showing embodiments of the present invention in which a corrective action may be recommended based on signal characteristics measured at a device connection point.

In some embodiments of the present invention, described in relation to FIG. 3, if the observed signal class is not the same as the expected signal class 28, then, in addition to reporting failure 29, a corrective action may be indicated 30.

Figure 4:
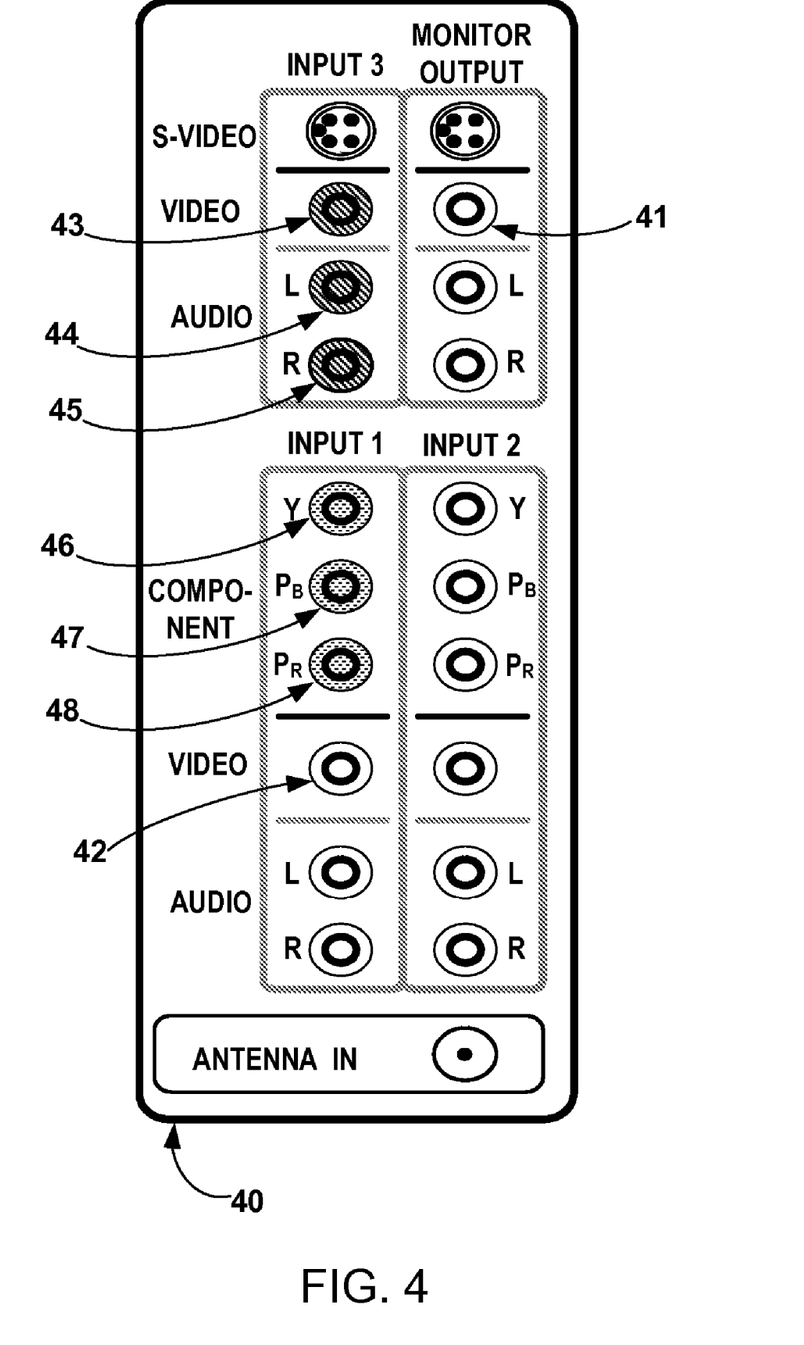
FIG. 4 illustrates an exemplary graphical representation which may communicate connection status in embodiments of the present invention.

FIG. 4 illustrates an exemplary method for reporting whether or not a cabling configuration is correct. FIG. 4 shows a graphical representation 40 of an exemplary connection panel for a TV. Connection points, for example 41, 42, are shown for a variety of inputs and outputs. An un-shaded, uncolored, un-patterned or otherwise distinguished connection point may indicate that no signal is detected at that particular connector. For example, as shown in FIG. 4, a connector shown in black and white with no shading or pattern, for example 41, 42, may indicate that no signal is detected at that connector.

The graphical representation corresponding to a connector at which a signal with the expected characteristics is detected may be shaded, colored, patterned or otherwise distinguished to indicate that the cable connected to the connector may be properly connected. For example, in FIG. 4, connectors 43-45 are shown with a first pattern which may indicate that the signals detected at these connectors 43-45 exhibit the expected characteristics. Therefore, the cabling, or connections, for these connectors 43-45 may be considered correct or proper. Connectors 46-48 are shown in a second pattern which may indicate that the signals detected at these connectors 46-48 do not exhibit the expected characteristics. Therefore, the cabling, or connections, for these connectors 46-48 may be considered incorrect or improper.

Figure 5A:
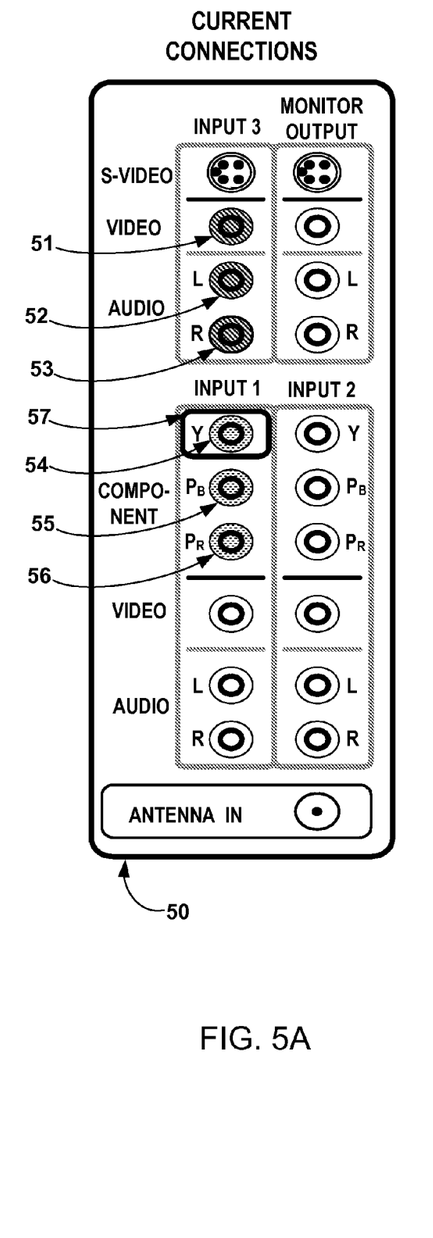
FIG. 5A illustrates an exemplary graphical representation which may communicate connection status in embodiments of the present invention.
Figure 5B:
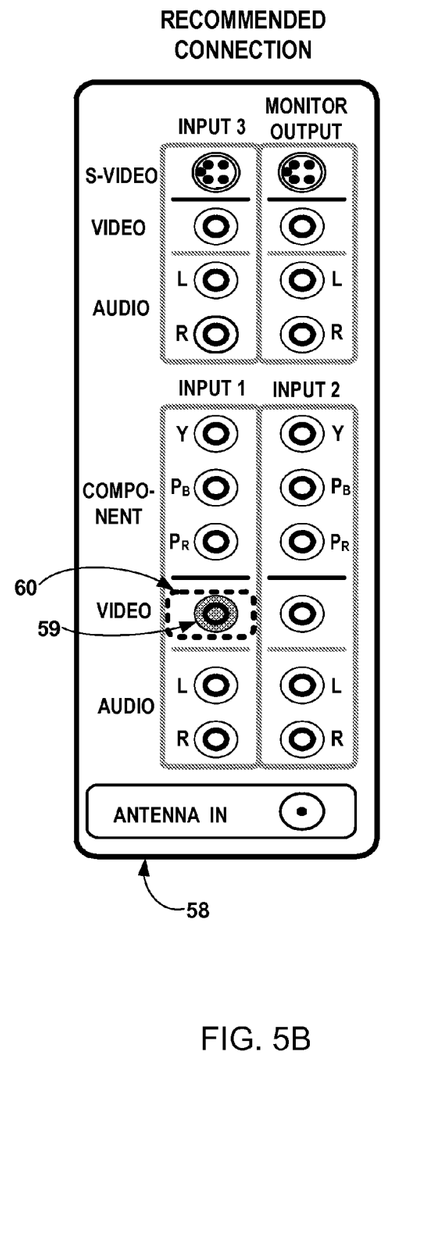
FIG. 5B illustrates an exemplary graphical representation which may communicate a corrective-action recommendation in embodiments of the present invention.

In some embodiments of the present invention, a corrective action may be indicated to a user, or customer. FIG. 5 illustrates an exemplary method for indicating a corrective action. Shown in FIG. 5A is a graphical representation 50 of an exemplary connection panel for a TV. The graphical representation 50 is shown with the detected connections. In this example, connections 51-53 are shown with a first pattern to indicate that the signal detected at each of these connections 51-53 exhibits the expected characteristics, indicating proper cabling. Connections 54-56 are shown with a second pattern which may indicate that the signal detected at each of these connections 54-56 does not exhibit the expected characteristics, indicating improper cabling. The user may position a cursor 57 over a terminal for which a query for a recommended connection may be made. In some embodiments of the present invention, a separate graphical representation 58, shown in FIG. 5B, indicating a corrective action may be displayed. A recommended connection may be indicated by a distinguishing shading, coloring, patterning or other unique display characteristic (for example, blinking) of the connector 59. In some embodiments a cursor 60 may be used to show the recommended connection.

In some embodiments, a user may position the cursor 57 using navigation keys (for example, up/down/left/right arrow buttons) on a remote control device for the associated communicatively-connected device (for example, a TV). In alternative embodiments, a user may position the cursor 57 using navigation keys (for example, channel up/down, volume up/down) on the device itself.

Figure 6:
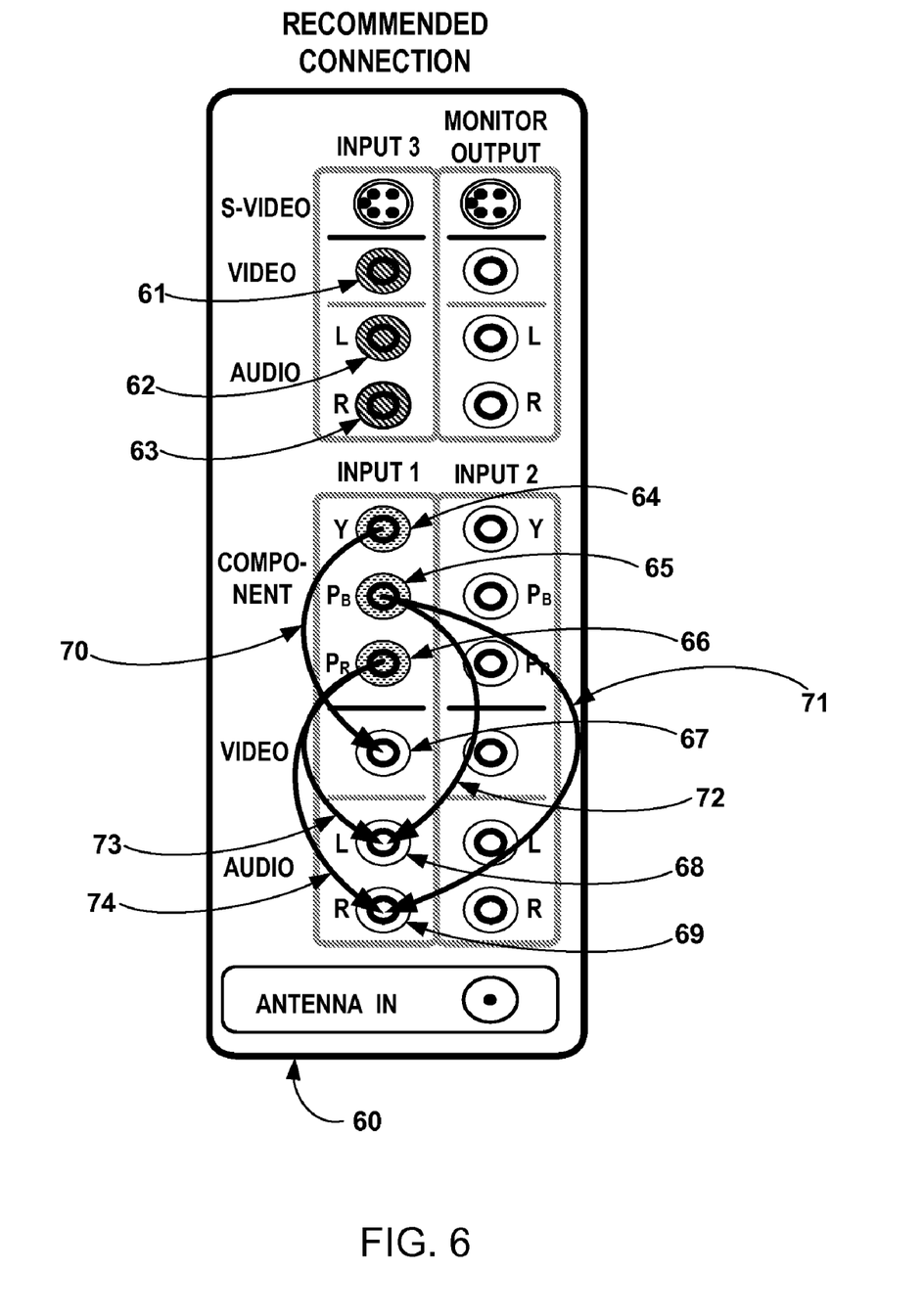
FIG. 6 illustrates an exemplary graphical representation which may communicate a corrective-action recommendation in embodiments of the present invention.

Another exemplary method by which a corrective action may be communicated to a user, or customer, may be described in relation to FIG. 6. Shown in FIG. 6 is a graphical representation 60 of an exemplary connection panel for a TV. The graphical representation 60 is shown with the detected connections. In this example, connections 61-63 are shown with a first pattern to indicate that the signal detected at each of these connections 61-63 exhibits the expected characteristics, indicating proper cabling. Connections 64-66 are shown with a second pattern which may indicate that the signal detected at each of these connections 64-66 does not exhibit the expected characteristics, indicating improper cabling.

Recommended connection corrections may be shown on the graphical representation 60 of the connection panel. An exemplary method for showing the corrections may comprise an arrow indicating a recommended connector to which an improperly positioned cable may be moved. In the example shown in FIG. 6, if the signal detected at the component-Y input terminal 64 does not exhibit the characteristics expected for a component-Y input signal, then an arrow from this connector to another connector may be shown in the graphical representation 60 of the connection panel. If, for example, the measured signal characteristics indicate that the signal is a video signal, a recommended correction of moving the cable connected at the component-Y input terminal 64 to the video input terminal 67 may be shown with an arrow 70 from the component-Y input 64 to the video input 67.

If there is more than one choice of correct connections, then more than one arrow may be used to show the different choices. In the example shown in FIG. 6, if the signal characteristics detected at the $P_B$ component input terminal 65 are consistent with an audio signal, then a first arrow 72 from the $P_B$ component input terminal 65 may indicate a possible connection to the left audio input terminal 68 and a second arrow 71 from the $P_B$ component input terminal 65 may indicate another possible connection to the right audio input terminal 69. If the signal characteristics detected at the $P_R$ component input terminal 66 are consistent with an audio signal, then a first arrow 73 from the $P_R$ component input terminal 66 may indicate a possible connection to the left audio input terminal 68 and a second arrow 74 from the $P_R$ component input terminal 66 may indicate another possible connection to the right audio input terminal 69.

In some embodiments of the present invention, a signal present at an input of a communicatively-connected device may be automatically examined to determine if the signal exhibits the expected characteristics.

In some embodiments of the present invention, a communicatively-connected device may perform a connection diagnostic operation in response to a user request. A user request may be made through a selection of a menu option in a graphical user interface, a control button selection, for example a button on a remote control device, or other methods.

In some embodiments of the present invention, a communicatively-connected device may stop driving an output terminal to determine if an external device may be applying a signal at the output terminal. Any of the above-described input-related methods and systems for signal characterization and reporting of results and corrective action be used to identify improper connections at an output terminal of a communicatively-connected device.

Figure 7:
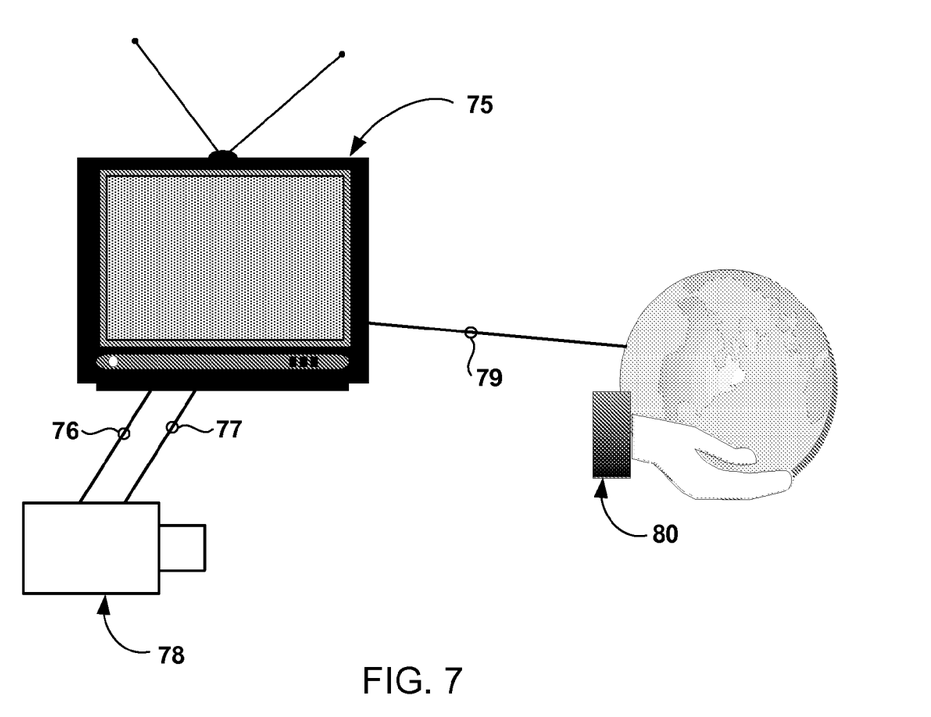
FIG. 7 is a diagram of embodiments of the present invention comprising a remote service location.

In some embodiments of the present invention described in relation to FIG. 7, a first device 75 may be communicatively connected with a second device, or peripheral, 78. The first device 75 may further be connected 79 to a remote service center 80. The second device 78 may provide one or more input signals (two shown) 76, 77 to the first device 75. In some embodiments of the present invention, a connection diagnostic may be executed at the first device 75 in response to a request received from the remote service center 80. Signal characteristics measured at the first device 75 may be communicated to the remote service center 80 for analysis, and instructions for corrective action may be sent from the remote service center 80 to the local, first device 75. Methods and systems for control and communication between the local device 75 and the remote service center 80 are disclosed in U.S. patent application Ser. No. 11/367,939, entitled "Method and System for Configuring Media-Playing Sets," filed Mar. 3, 2006, which is hereby incorporated herein by reference in its entirety. Methods and systems for control and communication between the local device 75 and the remote service center 80 are disclosed in U.S. patent application Ser. No. 11/367,937, entitled "Method and System for Configuring Media-Playing Sets," filed Mar. 3, 2006, which is hereby incorporated herein by reference in its entirety.

Figure 8:
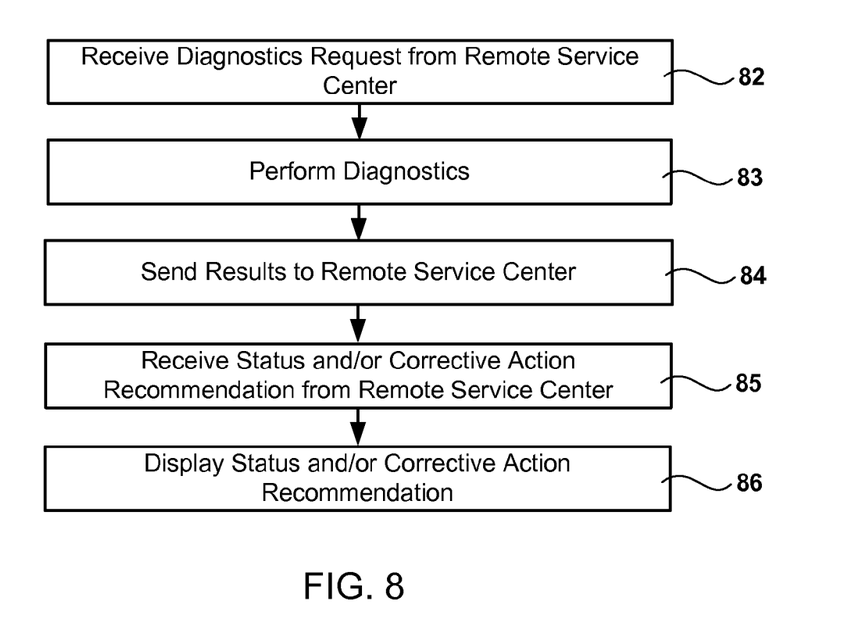
FIG. 8 is a flow diagram showing embodiments of the present invention in which a remote service location may request diagnostics at a local device.

Some embodiments of the present invention may be described in relation to FIG. 8. In these embodiments, a request to perform connection diagnostics may be received 82 at a local device from a remote service center. The local device may perform the requested diagnostics 83, and may then send 84 the results to the remote service center. The local device may then receive 85 status information and, in some situations where corrective action may be required, a recommendation of corrective action. The local device may then display 86 the received information, status and any corrective action recommendations. In these embodiments, the local device may be, through a secure connection, accessed and controlled by a customer service representation at the remote service center, the local device may interact with software running on a server at the remote service center and may access databases stored at the remote server.

Embodiments of the present invention described herein in relation to a television are used for illustration and not limitation. The systems and methods described herein may be embodied in other communicatively-connected devices, for example, video cassette recorders (VCRs), digital versatile disc (DVD) players, personal video recorders (PVRs), audio players, digital cameras, digital video cameras and others.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for resolving a connection status of a device, said method comprising:

measuring a first signal characteristic of a signal at a first connector of a hardware device, thereby producing a first measured-signal characteristic, wherein said measuring is performed by said hardware device and said measuring measures a spectral content of said signal and wherein said first connector is classified as an audio connector or a video connector;

classifying said signal as a video signal when said spectral content comprises content over approximately 20 KHz;

classifying said signal as an audio signal when said spectral content comprises content below approximately 20 KHz but not above approximately 20 KHz;

comparing said signal classification with said first connector classification; and displaying a graphical representation of a connection panel comprising said first connector, wherein said graphical representation comprises a connection correction indicator indicating a correct position of an improperly positioned cable when said signal classification is not substantially similar to said first connector classification.

2. A method according to claim 1, wherein said connection correction indicator is an arrow pointing from said first connection to a suggested connection.

3. A method according to claim 1, wherein said graphical representation of a connection panel further comprises connection pattern indicia indicating that a measured-signal characteristic for a connection is substantially similar to an expected-signal characteristic for said connection.

4. A method according to claim 1, wherein said device is a television.

5. A method according to claim 1, wherein said measuring is in response to receiving a request from a remote service center.

6. A method according to claim 1, wherein said graphical representation of said connection panel comprises a plurality of arrows pointing from an incorrectly positioned connector to a plurality of recommended connections.

7. A method according to claim 1 further comprising reporting to a remote service center when said signal classification is not substantially similar to said first connector classification.

8. A method according to claim 1 further comprising not driving a first output when said first output corresponds to said first connector.

9. A method for resolving a connection status of a device, said method comprising:

measuring a first signal characteristic of a signal at a first connector of a device, thereby producing a first measured-signal characteristic, wherein said measuring measures a spectral content of said signal;

communicating said first measured-signal characteristic to a remote service center from said device;

communicating an identification of said first connector to said remote service center from said device, wherein said identification indicates whether said first connector is an audio connector or a video connector;

receiving, at said device from said remote service center, a status indicator associated with said first connector, wherein said status indicator indicates an incorrect connection when said first measured-signal characteristic indicates spectral content over approximately 20 KHz and said first connector is an audio connector or said first measured-signal characteristic indicates no spectral content over approximately 20 KHz with some spectral content under 20 KHz and said first connector is a video connector; and displaying a graphical representation of a connection panel comprising said first connector, wherein said graphical representation comprises a connection correction indicator indicating a correct position of an improperly positioned cable when said status indicator indicates an incorrect connection.

10. A method according to claim 9, wherein said measuring is performed in response to a request from said remote service center.

11. A method according to claim 9 further comprising receiving, at said device from said remote service center, a recommendation for a corrective action associated with said first connector.

12. A method according to claim 9, wherein said device is a television.

13. A system for resolving a connection status of a device, said system comprising:

a signal characteristic detector for measuring a signal characteristic of a signal at a first connector of a device, thereby producing a measured-signal characteristic, wherein said measuring measures a spectral content of said signal and wherein said first connector is classified as an audio connector or a video connector;

a comparator for comparing said measured-signal characteristics with an expected-signal characteristic associated with said first connector;

a first status indicator for reporting a first status, wherein said first status indicates an incorrect connection when said first measured-signal characteristic indicates spectral content over approximately 20 KHz and said first connector is an audio connector or said first measured-signal characteristic indicates no spectral content over approximately 20 KHz with some spectral content under 20 KHz and said first connector is a video connector; and a display for displaying a graphical representation of a connection panel comprising said first connector, wherein said graphical representation comprises a connection correction indicator indicating a correct position of an improperly positioned cable when said first status indicator indicates an improper incorrect connection.

14. A system according to claim 13, wherein said device is a television.

15. A system according to claim 13 wherein said connection correction indicator comprises an arrow from said first connection to a suggested connection.

16. A method for resolving a connection status of a device, said method comprising:

measuring a first signal characteristic of a signal at a first connector of a hardware device comprising said first connector of a first connector type and a second connector of said first connector type, thereby producing a first measured-signal characteristic, wherein said measuring is performed by said hardware device, and wherein said measuring measures a spectral content of said signal;

wherein a first expected-signal type is associated with said first connector and wherein said first expected-signal type is one of an audio signal type and a video signal type; and wherein a second expected-signal type is associated with said second connector and wherein said second expected-signal type is one of an audio signal type and a video signal type;

determining, based on said first signal characteristic, a measured-signal type, wherein said measured-signal type is a video signal type if said first signal characteristic indicates spectral signal content above approximately 20 KHz and said measured-signal type is an audio signal type if said first signal characteristic indicates no spectral signal content above approximately 20 KHz, but some spectral signal content below approximately 20 KHz;

reporting a first status associated with said first connector when said measured-signal type is said first expected-signal type;

reporting a second status associated with said first connector when said measured-signal type is not said first expected-signal type; and displaying a graphical representation of a connection panel comprising said first connector, wherein said graphical representation comprises a connection correction indicator indicating a correct position of an improperly positioned cable when said reporting a second status occurs.

17. A method according to claim 16 wherein said connection correction indicator comprises an arrow pointing from said first connector to said second connector when said reporting a second status occurs.

18. A method according to claim 16, wherein said device is a television.

19. A method according to claim 16 further comprising not driving a first output when said first output corresponds to said first connector.

20. A method according to claim 16, wherein said measuring is performed in response to a request from a remote service center.

* * * * *